United States Patent
Trainin

(10) Patent No.: US 8,385,970 B2
(45) Date of Patent: *Feb. 26, 2013

(54) CHANNEL WIDTH SWITCHING IN MULTIPLE OBSS SYSTEMS

(75) Inventor: Solomon Trainin, Haifa (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/351,388

(22) Filed: Jan. 17, 2012

(65) Prior Publication Data
US 2012/0115420 A1 May 10, 2012

Related U.S. Application Data

(63) Continuation of application No. 11/967,306, filed on Dec. 31, 2007, now Pat. No. 8,126,502.

(51) Int. Cl.
*H04M 1/00* (2006.01)
(52) U.S. Cl. .......... 455/552.1; 455/41.2; 455/515; 370/338; 370/342; 375/346
(58) Field of Classification Search .......... 455/41.2, 455/515, 552.1, 560; 370/338, 342, 392; 375/346
See application file for complete search history.

(56) References Cited

U.S. PATENT DOCUMENTS

| 5,815,525 | A | * | 9/1998 | Smith et al. | 375/130 |
| 6,609,010 | B1 | | 8/2003 | Dolle et al. | |
| 7,301,955 | B1 | * | 11/2007 | Tryfonas et al. | 370/412 |
| 8,126,502 | B2 | | 2/2012 | Trainin | |
| 2007/0230423 | A1 | * | 10/2007 | Yoshida et al. | 370/338 |
| 2008/0112400 | A1 | | 5/2008 | Dunbar et al. | |
| 2008/0176568 | A1 | | 7/2008 | Palanki et al. | |
| 2009/0168738 | A1 | | 7/2009 | Trainin | |

* cited by examiner

*Primary Examiner* — Tuan H Nguyen
(74) *Attorney, Agent, or Firm* — Cool Patent, P.C.; Kenneth J. Cool; Joseph P. Curtin

(57) ABSTRACT

Briefly, in accordance with one or more embodiments, a device is capable of operating at a first bandwidth or a second bandwidth, and further capable of operating using a communication method intolerant to operation at the first bandwidth. If operation using a communication method intolerant to operation at the first bandwidth is desired, the device transmits an assertion of intolerance of operation at the first bandwidth to one or more devices on the network to cause the one or more devices on the network to switch operation at the second bandwidth.

20 Claims, 4 Drawing Sheets

CHANNEL WIDTH SWITCHING IN MULTIPLE OBSS SYSTEMS

BACKGROUND

In a high-throughput wireless local area network (HT WLAN), such as defined by the Institute of Electrical and Electronics Engineers (IEEE) 802.11n specification, devices may operate in the 2.4 GHz band using 40 MHz wide channels or 20 MHz wide channels, thereby allowing a 40 MHz capable basic services set (BSS) to switch between operation in a 20 MHz wide channel or in a 40 MHz wide channel. Under such an arrangement, some devices may be interfered with by others' 40 MHz operation, for example devices that are operating in accordance with a BLUETOOTH standard will be interfered with by the 802.11n devices operating in a 40 MHz wide channel. The interference will be result of operating BLUETOOTH in the vicinity of the IEEE 802.11n devices that belong to a different BSS that overlaps in this area, overlapping basic services set (OBSS). To accommodate BLUETOOTH devices, devices operating in 40 MHz wide channels should switch to operation in 20 MHz wide channels to allow better BLUETOOTH coexistence with 802.11n devices. In order to implement a dual channel width system, however, stations that are capable of operating in both 40 MHz channels and 20 MHz channels are required to scan the set of 20 MHz channels to listen for stations that indicates operating BLUETOOTH and then switch if one or more such devices are found. Thus, stations that are not access points potentially may be required to scan up to all of the channels on which the station is capable of operating, even if such stations are in a power-saving mode. Furthermore, an access point may be required to quiet its BSS for a relatively longer period of time while scanning both 40 MHz and 20 MHz channels.

DESCRIPTION OF THE DRAWING FIGURES

Claimed subject matter is particularly pointed out and distinctly claimed in the concluding portion of the specification. Such subject matter may, however, be understood by reference to the following detailed description when read with the accompanying drawings in which:

Figure 1:
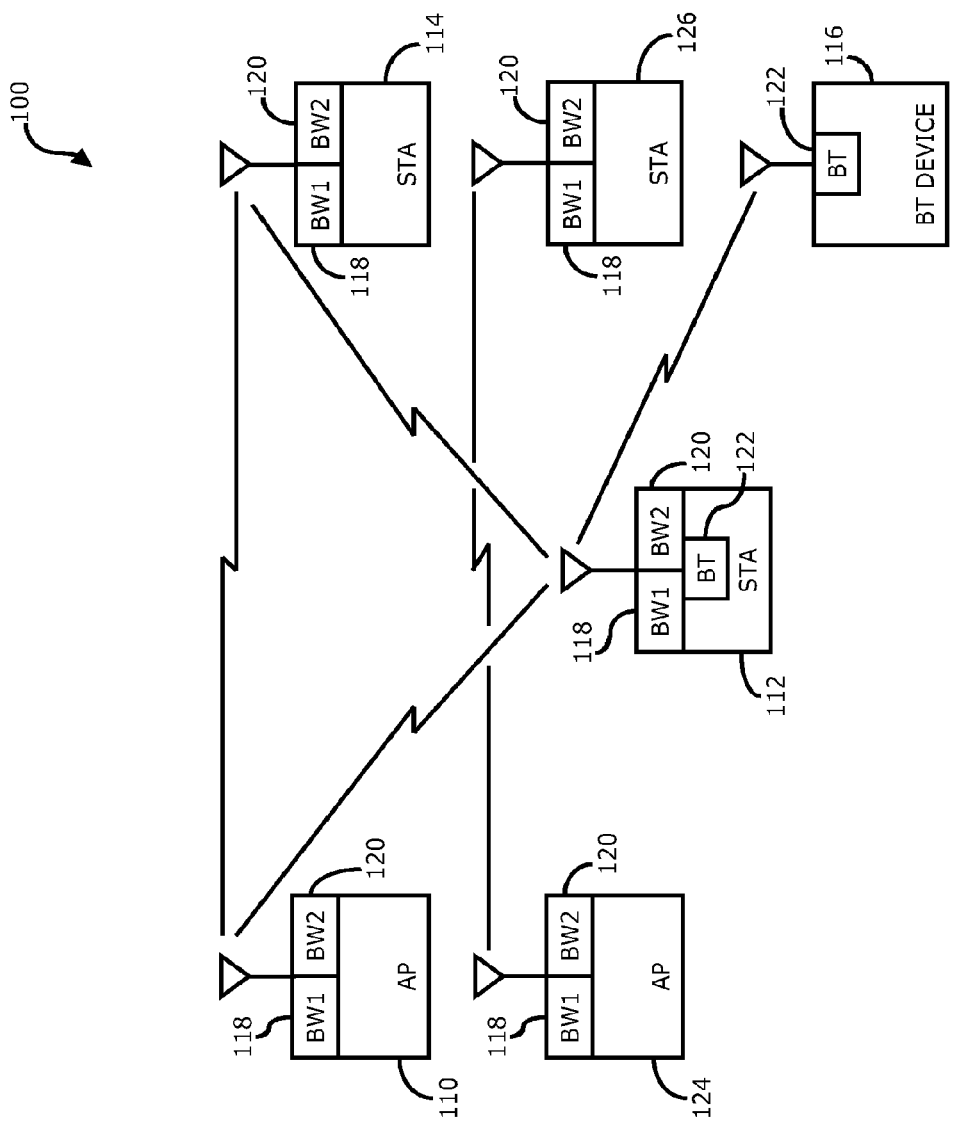
FIG. 1 is a block diagram of a system in which an overlapping basic services sets (OBSS) may be implemented in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled may, however, also mean that two or more elements may not be in direct contact with each other, but yet may still cooperate and/or interact with each other. For example, "coupled" may mean that two or more elements do not contact each other, but are indirectly joined together via another element or intermediate elements. Finally, the terms "On," "overlying," and "over" may be used in the following description and claims. "On," "overlying," and "over" may be used to indicate that two or more elements are in direct physical contact with each other. "Over" may, however, also mean that two or more elements are not in direct contact with each other. For example, "over" may mean that one element is above another element but not contact each other and may have another element or elements in between the two elements. Furthermore, the term "and/or" may mean "and," it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

Referring now to FIG. 1, a block diagram of a system in which an overlapping basic services sets (OBSS) may be implemented in accordance with one or more embodiments will be discussed. As shown in FIG. 1, in a wireless system 100 an access point 110 may be capable of operating with a basic services set (BSS) using a first bandwidth (BW1) 118 or alternatively at a second bandwidth 120. A Basic Service Set such as in IEEE 802.11 means that two or more stations communicate with each other, in which one of the stations may be an access point. If some stations of a first BSS can hear stations of a different BSS, then the BSSs are overlapping BSS (OBSS). As shown in FIG. 1, a first BSS may be implemented by AP 110 and STA 114, and another BSS may be implemented by AP 124 and STA 126, thereby resulting in OBSS. Stations that belong to the same BSS may use different messages for signaling between other stations of the same BSS. Messages that can be used for signaling in OBSS are substantially limited. For example, access point 110 may be capable of operating in compliance with an Institute of Electrical and Electronics Engineers (IEEE) 802.11n standard at 2.4 GHz in which the bandwidth 118 comprises 40 MHz and the second bandwidth 120 comprises 20 MHz. In one or more embodiments, access point 110 may be capable of communicating with station 112 or station 114 by operating at the first bandwidth 118 of 40 MHz or at the second bandwidth 120 of 20 MHz using an IEEE 802.11n compliant BSS. In one or more embodiments, station 112 may also be capable of communicating using a BLUETOOTH standard as promulgated by the BLUETOOTH Special Interest Group (SIG), or similar, for example, to communicate with BLUETOOTH device 116 via BLUETOOTH 122. BLUETOOTH implements a mechanism of frequency hopping in the entire 2.4 GHz band. If BLUETOOTH devices operate in the same region as other non-BLUETOOTH devices, such as IEEE 802.11 devices, the BLUETOOTH devices may avoid using frequencies in the 2.4 GHz band that are occupied by the IEEE 802.11 devices without impairment to the BLUETOOTH devices if the IEEE 802.11 devices are using 20 MHz channels. If, however, the IEEE 802.11 devices are using 40 MHz channels, then if the BLUETOOTH devices eliminate those frequencies occupied by IEEE 802.11 devices using 40 MHz channels, communication between the BLUETOOTH devices may be degraded in quality. Station 112 may communicate with device 116 using BLUETOOTH. As a result, devices operating using IEEE 802.11n communications with a 40 MHz channel or the like may interfere with devices operating using BLUETOOTH communication 122.

In one or more embodiments, station 112 may desire to communicate with device 116 using BLUETOOTH 122. In order to allow station 112 and device 116 to communicate with each other using BLUETOOTH and to mitigate or avoid interference by nearby devices operating using an IEEE 802.11 BSS, stations operating at the first bandwidth 118 of 40 MHz could switch over to operation at the second bandwidth 120 of 20 MHz. In order, however, for a given station, such as station 114, to know when another station is operating using BLUETOOTH 122 would require that device and/or up to all other devices on network 100 to scan all channels at the first bandwidth 118 and the second bandwidth 120 to determine if another device, such as device 116, is operating at using BLUETOOTH 122. Furthermore, while access point 110 is performing such scanning, access point 110 may not be able to broadcast to other devices. In one or more embodiments, a device that desires to communicate using BLUETOOTH 122 may broadcast to other devices on network 100 that the device using BLUETOOTH 122 is not tolerant of operation at the first bandwidth 118 since operation at the first bandwidth 118 of 40 MHz in IEEE 802.11 may interfere with such BLUETOOTH 122 operation. Such a notification of intolerance at the first bandwidth 118 may be broadcast via a Probe Request frame in any of the channels that the device using BLUETOOTH 122 views as sensitive to operation at the first channel width 118. Thus, in one or more embodiments, when station 112 wants to communicate with device 116 using BLUETOOTH 122, station 112 will broadcast its intolerance to operation at first bandwidth 118 of 40 MHz to all, or nearly all, of the other IEEE 802.11 devices on network 100 that station 112 is now intolerant to communications at first bandwidth 118. This method may be implemented in one or more embodiments in lieu of having station 112 merely broadcast its 40 MHz intolerance to access point 110 only and requiring the other stations in network 100 to listen for that communication between station 112 and access point 110. Upon receiving the notification from a device that the device is intolerant to operation at the first bandwidth 118, the other IEEE 802.11 devices on network 100 may switch to operation at second bandwidth 120. These devices on network 100 may continue to operate at second bandwidth 120 while the devices are continuing to receive notification of intolerance to operation at first bandwidth 118 from station 112. If the devices on network 100 do not receive any further notification of intolerance to operation at first bandwidth 118 for a predefined period of time, the devices may switch their operation back to bandwidth 110.

In one or more embodiments, network 100 may operate in an infrastructure mode of operation using access point 110 to manage communication between one or more other devices, such as station 112, station 114, and/or device 116. Alternatively, network 100 may operate in an Independent Basic Service Set (IBSS) mode, or ad-hoc mode, in which no device on network 100 is functioning as an access point. Furthermore, in one or more embodiments, access point 110, station 112, and/or station 114 may be operating in compliance with an IEEE 802.11n standard using first bandwidth 118 and second channel width 120 in which first channel bandwidth 118 may comprise 40 MHz and second channel width 120 may comprise 20 MHz in the 2.4 GHz spectrum. Likewise, station 112 may be operating in compliance with a BLUETOOTH standard using BLUETOOTH communication 122. In the event station 112 intends to communicate with device 116 via BLUETOOTH communication 122, station 112 may broadcast a signal indicating that station 112 is intolerant to operation at first bandwidth 118. In response, other IEEE 802.11 devices on network 100 may switch operation from first bandwidth 118 of 40 MHz to second bandwidth 120 of 20 MHz, and thereby force other devices, such as access point 110 and/or station 114, to communicate using second bandwidth 120. It should be noted, however, that these are merely example for operation of network 100 in compliance with IEEE 802.11n and/or BLUETOOTH standards, and network 100 may likewise be operated in compliance with various other standards and/or special interest groups (SIGs), including by not limited to Worldwide Interoperability for Microwave Access (WiMAX) promulgated by the WiMAX Forum, the Third Generation Partnership Project, Long Term Evolution (3GPP-LTE), or the like, and the scope of the claimed subject matter is not limited in this respect. Further details of the operation of network 100 in the event of multiple overlapping BSS (OBSS) is discussed with respect to FIG. 2, below.

Figure 2:
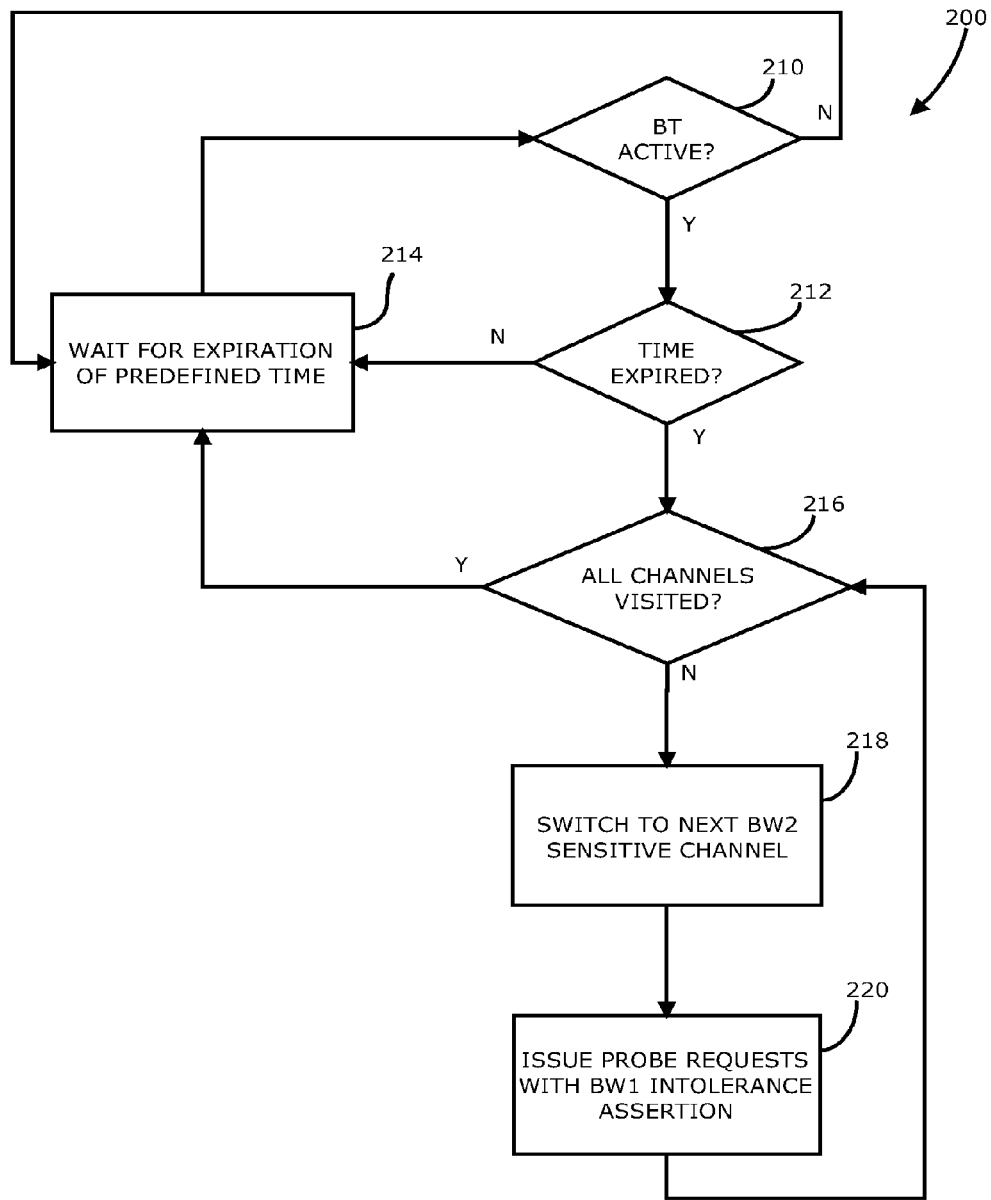
FIG. 2 is a flow diagram of a method to switch operation of OBSS to a second channel width in accordance with one or more embodiments.

Referring now to FIG. 2, a flow diagram of a method to switch operation of OBSS to a second channel width in accordance with one or more embodiments will be discussed. By using method 200, a station, such as station 112 that wants to communicate using BLUETOOTH 122 may switch all OBSS to operation at the second bandwidth 120 of 20 MHz so as to avoid interference that would otherwise occur from operation at first bandwidth 118 of 40 MHz. It should be noted that method 200 as shown in FIG. 2 is representative of an example method: however, method 200 is not limited to the particular order of the blocks shown, and may include more or fewer blocks than shown in FIG. 2, and the scope of the claimed subject matter is not limited in these respects. At block 210 a determination may be made whether BLUETOOTH 122 is active in network 100, for example, if one or more devices or stations are communicating via BLUETOOTH 122. If BLUETOOTH 122 is not active, IEEE 802.11 devices or stations may operate and communicate with other IEEE 802.11 devices or stations on network 100 via first bandwidth 118 of 40 MHz, and then may wait for a predefined time period at block 214, and then repeat the decision at block 210. So long as there are no devices or stations operating via BLUETOOTH 122, such devices or stations may stay in the loop defined by block 210 and block 214 and communicate using the BSS for bandwidth 118. If BLUETOOTH 122 is determined at block 210 to be active, the other devices will stop communicating at first bandwidth 118 of 40 MHz and switch to second bandwidth 120. A determination may be made at block 212 whether the predefined time has expired in which to operate using second channel width 120. As long as time has not yet expired, all, or nearly all, devices on network 100 will operate using second bandwidth 120, and method 200 may continue operation in the loop defined by block 212, 214, and 210, although the scope of the claimed subject matter is not limited in this respect.

In the event the predefined time has expired, a determination may be made at block 216 whether all channels at second channel width 120 have been visited by station 112 wanting to use or using BLUETOOTH 122. It is at this branch of method 200 that station 112 informs the other devices operating at first channel width 118 to cease operating at first channel width 120 and start operating at second channel width 120. To accomplish this, station 112 communicates with devices in the channels at first bandwidth 118 and/or second bandwidth 120 so the devices operating at first channel width 118 may be informed of the switch to second channel width 120. It is during execution of block 218 that station 112 informs other IEEE 802.11 devices to kill operation at first bandwidth 118 and switch to operation at second bandwidth 120. In the event that all channels have been visited and all devices operating at first bandwidth 118 and/or second bandwidth 120 have been informed to switch to second bandwidth 120, then operation of method 200 may continue at block 214 in which operation at second bandwidth 120 may occur. If, however, all channels have not yet been visited, at block 218 access point 110 may switch to a next channel at the first bandwidth 118 or the second bandwidth 120 to notify any device operating in at first bandwidth 118 to cease operation at first bandwidth 118 and switch to operation at second bandwidth 120. At block 220, station 112 may issue probe requests asserting its intolerance to operation at first bandwidth 118 of 40 MHz, so that the devices receiving the probe request will know to switch their operation to second bandwidth 120. Operation of method 200 may continue until all channels at first bandwidth 118 have been visited and informed of the switch to second bandwidth 120, at which time operation of method 200 may continue at block 214 with the operation of devices on network 100 at second channel width 120. After receiving such a probe request, any access point 110 may switch its BSS to operation at second bandwidth 120 of 20 MHz. Access point 110 may then choose to go back to operation at first bandwidth 118 after the predefined time if during such an interval access point is no longer receiving probe requests with an assertion of intolerance to operation at first bandwidth 118 of 40 MHz.

Figure 3:
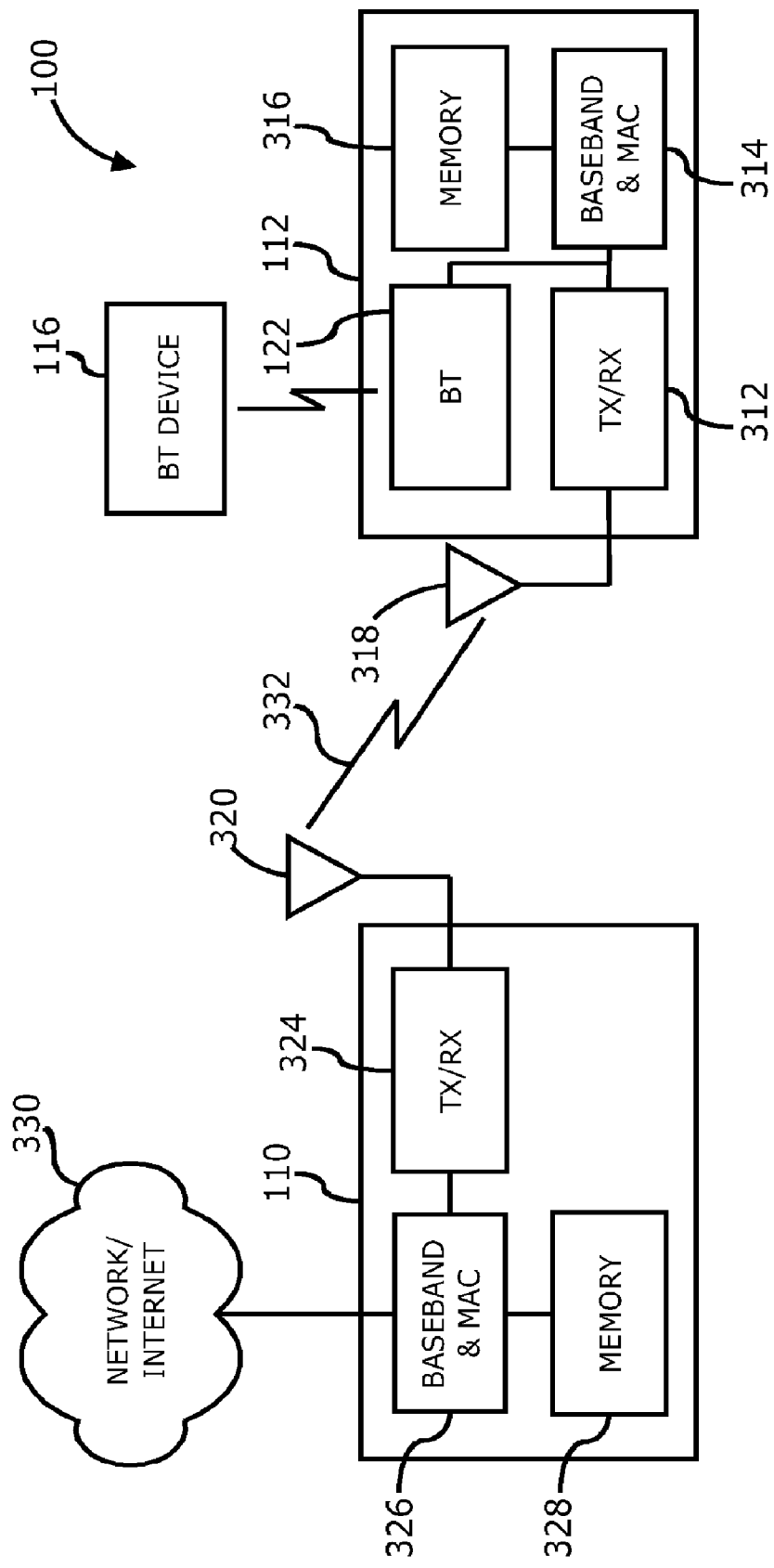
FIG. 3 is a block diagram of a wireless local area or cellular network communication system showing one or more network devices capable of forcing OBSS to switch to a second channel width in accordance with one or more embodiments.

Referring now to FIG. 3, a block diagram of a wireless local area or cellular network communication system showing one or more network devices capable of forcing OBSS to switch to a second channel width in accordance with one or more embodiments will be discussed. In the communication system 100 shown in FIG. 3, a station 112 may include a wireless transceiver 312 to couple to an antenna 318 and to a processor 314 to provide baseband and media access control (MAC) processing functions. Station 112 may further include a BLUETOOTH module 122 for communicating with a BLUETOOTH device 116 as described with respect to FIG. 1 and/or FIG. 2. In one or more embodiments, station 112 may be a cellular telephone or an information-handling system, such as a mobile personal computer or a personal digital assistant or the like, that incorporates a cellular telephone communication module, although the scope of the claimed subject matter is not limited in this respect. Processor 314 in one embodiment may comprise a single processor, or alternatively may comprise a baseband processor and an applications processor, although the scope of the claimed subject matter is not limited in this respect. Processor 314 may couple to a memory 316, which may include volatile memory, such as dynamic random-access memory (DRAM), non-volatile memory such as flash memory, or alternatively may include other types of storage such as a hard disk drive, although the scope of the claimed subject matter is not limited in this respect. Some portion or all of memory 316 may be included on the same integrated circuit as processor 314, or alternatively some portion or all of memory 316 may be disposed on an integrated circuit or other medium, for example, a hard disk drive, that is external to the integrated circuit of processor 314, although the scope of the claimed subject matter is not limited in this respect.

Station 112 may communicate with access point 110 via wireless communication link 332, in which access point 110 may include at least one antenna 320, transceiver 324, processor 326, and memory 328. In one embodiment, access point 110 may be a base station of a cellular telephone network, and in an alternative embodiment, access point 110 may be an access point or wireless router of a wireless local or personal area network, although the scope of the claimed subject matter is not limited in this respect. In an alternative embodiment, access point 110 and optionally station 112 may include two or more antennas, for example, to provide a spatial division multiple access (SDMA) system or a multiple input, multiple output (MIMO) system, although the scope of the claimed subject matter is not limited in this respect. Access point 110 may couple with network 330 so that station 112 may communicate with network 330, including devices coupled to network 330, by communicating with access point 110 via wireless communication link 332. Network 330 may include a public network, such as a telephone network or the Internet, or alternatively network 330 may include a private network such as an intranet, or a combination of a public and a private network, although the scope of the claimed subject matter is not limited in this respect. Communication between station 112 and access point 110 may be implemented via a wireless local area network (WLAN), for example, a network compliant with an Institute of Electrical and Electronics Engineers (IEEE) standard, such as IEEE 802.11a, IEEE 802.11b, IEEE 802.11n, HiperLAN-II, and so on, although the scope of the claimed subject matter is not limited in this respect. In another embodiment, communication between station 112 and access point 110 may be at least partially implemented via a cellular communication network compliant with a Third Generation Partnership Project (3GPP or 3G) standard, although the scope of the claimed subject matter is not limited in this respect. In one or more embodiments, antenna 318 may be utilized in a wireless sensor network or a mesh network, although the scope of the claimed subject matter is not limited in this respect.

Figure 4:
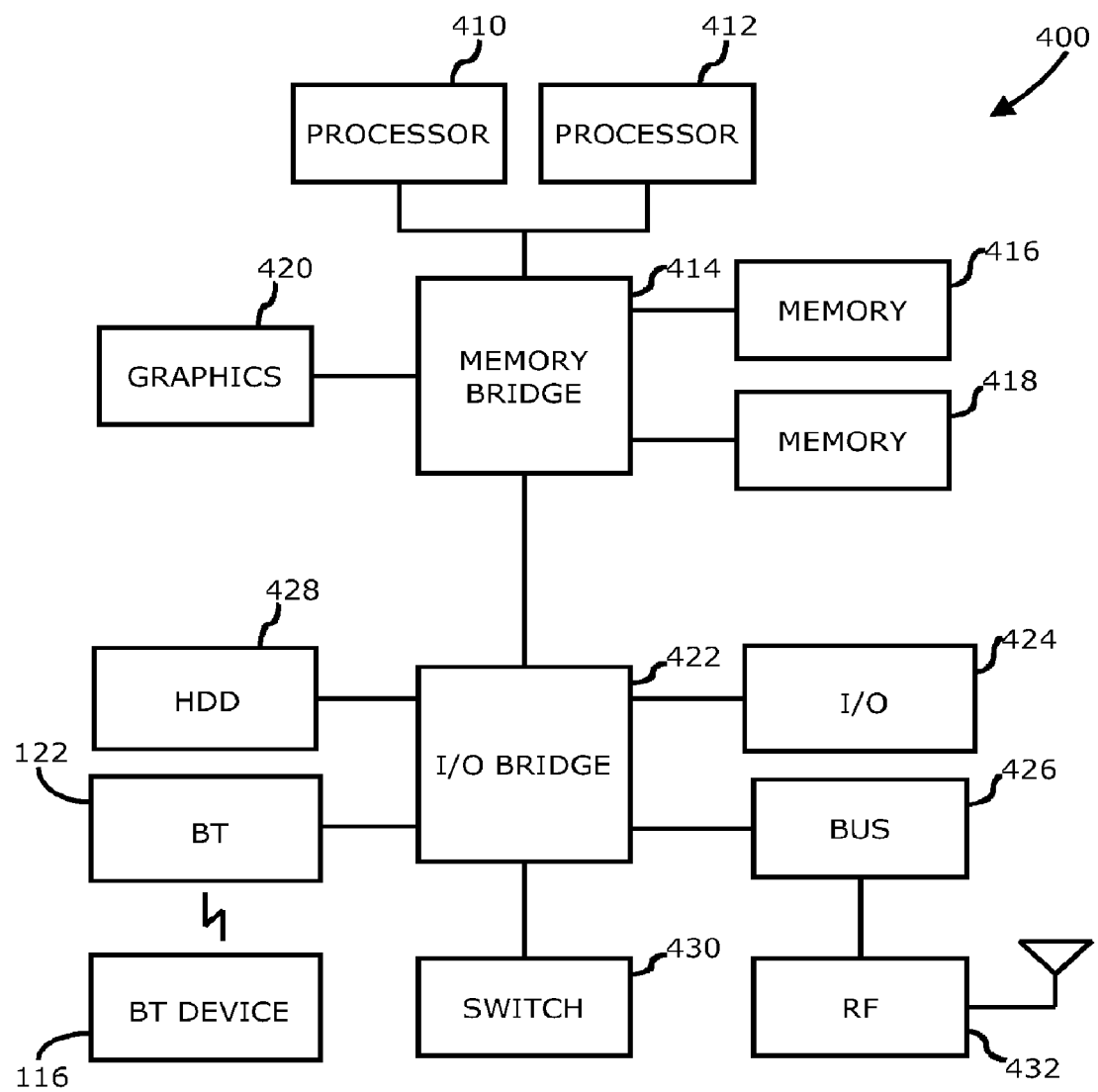
FIG. 4 is a block diagram of an information handling system capable of forcing OBSS to switch to a second channel width in accordance with one or more embodiments.

Referring now to FIG. 4, a block diagram of an information-handling system capable of forcing OBSS to switch to a second channel width in accordance with one or more embodiments will be discussed. Information-handling system 400 of FIG. 4 may tangibly embody one or more of any of the network elements of network 100 as shown in and described with respect to FIG. 1. For example, information-handling system 400 may represent the hardware of access point 110 and/or station 112, station 114, and/or device 116, with greater or fewer components depending on the hardware specifications of the particular device or network element. Information-handling system 400 may further include a BLUETOOTH module 122 for communicating with a BLUETOOTH device 116 as described with respect to FIG. 1 and/or FIG. 2. Although information-handling system 400 represents one example of several types of computing platforms, information-handling system 400 may include more or fewer elements and/or different arrangements of elements than shown in FIG. 4, and the scope of the claimed subject matter is not limited in these respects.

Information-handling system 400 may comprise one or more processors, such as processor 410 and/or processor 412, which may comprise one or more processing cores. One or more of processor 410 and/or processor 412 may couple to one or more memories 416 and/or 418 via Memory Bridge 414, which may be disposed external to processors 410 and/or 412, or alternatively at least partially disposed within one or more of processors 410 and/or 412. Memory 416 and/or memory 418 may comprise various types of semiconductor-based memory, for example, volatile-type memory and/or non-volatile-type volatile type memory. Memory bridge 414 may couple to a graphics system 420 to drive a display device (not shown) coupled to information-handling system 400.

Information-handling system 500 may further comprise input/output (I/O) bridge 422 to couple to various types of I/O systems. I/O system 424 may comprise, for example, a universal serial bus (USB) type system, an IEEE 1394 type system, or the like, to couple one or more peripheral devices to information-handling system 400. Bus system 426 may comprise one or more bus systems, such as a peripheral component interconnect (PCI) express type bus or the like, to connect one or more peripheral devices to information-handling system 400. A hard disk drive (HDD) controller system 428 may couple one or more hard disk drives or the like to information-handling system, for example, Serial ATA type drives or the like, or alternatively a semiconductor-based drive comprising flash memory, phase-change, and/or chalcogenide-type memory or the like. Switch 430 may be utilized to couple one or more switched devices to I/O bridge 422, for example, Gigabit Ethernet type devices or the like. Furthermore, as shown in FIG. 4, information-handling system 400 may include a radio-frequency (RF) block 432 comprising RF circuits and devices for wireless communication with other wireless communication devices and/or via wireless networks, such as network 100 of FIG. 1, for example, in which information-handling system 400 embodies access point 110 and/or device 116, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to channel width switching in multiple OBSS systems and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    operating at a first bandwidth in a network of devices capable of operating at the first bandwidth or a second bandwidth; and
    transmitting an assertion of intolerance of operation at the first bandwidth to one or more devices on the network if operation using a communication method intolerant to operation at the first bandwidth is desired to cause the one or more devices on the network to switch operation at the second bandwidth.

2. A method as claimed in claim 1, if all channels at the second bandwidth have not been visited, switching to a next channel at the second bandwidth and executing said transmitting in the next channel.

3. A method as claimed in claim 1, further comprising:
    communicating with the one or more devices via operation at the second bandwidth while operating using the communication method intolerant to operation at the first bandwidth.

4. A method as claimed in claim 1, further comprising:
    communicating with the one or more devices via operation at the second bandwidth until a predefined time has expired, and then allowing the one or more devices to switch back to operation at the first bandwidth.

5. A method as claimed in claim 1, further comprising:
    communicating with the one or more devices via operation at the second bandwidth until a predefined time has expired, and if no further intolerance assertions have been transmitted in the predefined time, then allowing the one or more devices to switch back to operation at the first bandwidth, and otherwise extending the predefined time.

6. A method as claimed as claim 1, said intolerance assertion being transmitted via a probe request.

7. A method as claimed in claim 1, wherein operation at the first bandwidth and at the second bandwidth is compliant with an IEEE 802.11n standard, and the communication method intolerant to operation at the first bandwidth is compliant with a BLUETOOTH standard.

8. A device capable of operating at a first bandwidth or a second bandwidth, and further capable of operating using a communication method intolerant to operation at the first bandwidth, comprising:
    a baseband processor; and
    a radio-frequency transceiver coupled to the baseband processor to communicate with one or more devices in a wireless network;
    wherein the baseband processor is configured to:
    operate at a first bandwidth in a network of devices capable of operating at the first bandwidth or a second bandwidth; and
    transmit an assertion of intolerance of operation at the first bandwidth to one or more devices on the network if operation using a communication method intolerant to operation at the first bandwidth is desired to cause the one or more devices on the network to switch operation at the second bandwidth.

9. A device as claimed in claim 8, wherein the baseband processor is further configured to:
    if all channels at the second bandwidth have not been visited, switch to a next channel at the second bandwidth and execute said transmission in the next channel.

10. A device as claimed in claim 8, further comprising:
    communicating with the one or more devices via operation at the second bandwidth while operating using the communication method intolerant to operation at the first bandwidth.

11. A device as claimed in claim 8, further comprising:
    communicating with the one or more devices via operation at the second bandwidth until a predefined time has expired, and then allowing the one or more devices to switch back to operation at the first bandwidth.

12. A device as claimed in claim 8, further comprising:
    communicating with the one or more devices via operation at the second bandwidth until a predefined time has expired, and if no further intolerance assertions have been transmitted in the predefined time, then allowing the one or more devices to switch back to operation at the first bandwidth, and otherwise extending the predefined time.

13. A device as claimed as claim 8, said intolerance assertion being transmitted via a probe request.

14. A device as claimed in claim 8, wherein operation at the first bandwidth and at the second bandwidth is compliant with an IEEE 802.11n standard, and the communication method intolerant to operation at the first bandwidth is compliant with a BLUETOOTH standard.

15. An article of manufacture comprising a non-transient storage medium having instructions stored thereon that, if executed, result in:
   operating at a first bandwidth in a network of devices capable of operating at the first bandwidth or a second bandwidth; and
   transmitting an assertion of intolerance of operation at the first bandwidth to one or more devices on the network if operation using a communication method intolerant to operation at the first bandwidth is desired to cause the one or more devices on the network to switch operation at the second bandwidth.

16. An article of manufacture as claimed in claim 15, wherein the instructions if executed further result in:
   if all channels at the second bandwidth have not been visited, switching to a next channel at the second bandwidth and executing said transmitting in the next channel.

17. An article of manufacture as claimed in claim 15, wherein the instructions if executed further result in:
   communicating with the one or more devices via operation at the second bandwidth while operating using the communication method intolerant to operation at the first bandwidth.

18. An article of manufacture as claimed in claim 15, wherein the instructions if executed further result in:
   communicating with the one or more devices via operation at the second bandwidth until a predefined time has expired, and then allowing the one or more devices to switch back to operation at the first bandwidth.

19. An article of manufacture as claimed in claim 15, wherein the instructions if executed further result in:
   communicating with the one or more devices via operation at the second bandwidth until a predefined time has expired, and if no further intolerance assertions have been transmitted in the predefined time, then allowing the one or more devices to switch back to operation at the first bandwidth, and otherwise extending the predefined time.

20. An article of manufacture as claimed in claim 15, the intolerance assertion being transmitted via a probe request.

* * * * *

UNITED STATES PATENT AND TRADEMARK OFFICE
CERTIFICATE OF CORRECTION

PATENT NO. : 8,385,970 B2
APPLICATION NO. : 13/351388
DATED : February 26, 2013
INVENTOR(S) : Solomon Trainin Page 1 of 1

It is certified that error appears in the above-identified patent and that said Letters Patent is hereby corrected as shown below:

In the Claims:

In column 8, line 20, in claim 6, delete "as" and insert -- in --, therefor.

In column 9, line 1, in claim 13, delete "as" and insert -- in --, therefor.

Signed and Sealed this
Fourth Day of June, 2013

Teresa Stanek Rea
*Acting Director of the United States Patent and Trademark Office*